US011073748B2

(12) United States Patent
Yano

(10) Patent No.: US 11,073,748 B2
(45) Date of Patent: Jul. 27, 2021

(54) ACCESSORY AND CAMERA SYSTEM

(71) Applicant: CANON KABUSHIKI KAISHA, Tokyo (JP)

(72) Inventor: Yukiteru Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/556,980

(22) Filed: Aug. 30, 2019

(65) Prior Publication Data
US 2020/0073213 A1     Mar. 5, 2020

(30) Foreign Application Priority Data

Sep. 4, 2018  (JP) .............................. JP2018-165023

(51) Int. Cl.
G03B 17/56     (2021.01)
H04N 5/232     (2006.01)

(52) U.S. Cl.
CPC ....... *G03B 17/563* (2013.01); *H04N 5/23241* (2013.01)

(58) Field of Classification Search
CPC ............ G03B 17/563; G03B 2217/007; G03B 17/56; G03B 17/02; G03B 17/561; H04N 5/23241; H04N 5/2251; H04N 5/2254
See application file for complete search history.

(56) References Cited

U.S. PATENT DOCUMENTS

| | | | | |
|---|---|---|---|---|
| 4,464,031 A * | 8/1984 | Iwashita | ............... | G03B 17/425 396/388 |
| 5,325,143 A | 6/1994 | Kawano | | |
| 6,292,631 B1 * | 9/2001 | Tanaka | ..................... | G03B 7/26 396/280 |
| 6,826,366 B2 * | 11/2004 | Kaneko | .................. | G03B 17/02 396/388 |
| 7,726,890 B2 * | 6/2010 | Misawa | ................. | G03B 17/02 396/529 |
| 10,437,138 B1 * | 10/2019 | Fudala | ................. | G03B 17/561 |

(Continued)

FOREIGN PATENT DOCUMENTS

| | | |
|---|---|---|
| CN | 2879238 Y | 3/2007 |
| CN | 201259605 Y | 6/2009 |
| CN | 201278073 Y | 7/2009 |

(Continued)

OTHER PUBLICATIONS

The above documents were cited in an Apr. 16, 2021 Chinese Office Action, which is enclosed with an English Translation, that issued in Chinese Patent Application No. 201910827982.4.

*Primary Examiner* — Twyler L Haskins
*Assistant Examiner* — Angel L Garces-Rivera
(74) *Attorney, Agent, or Firm* — Cowan, Liebowitz & Latman, P.C.

(57) ABSTRACT

An accessory attachable to an image pickup apparatus through an adapter includes a body portion configured to contact the adapter, a screw engageable with a screw hole in the image pickup apparatus through a through-hole formed in the adapter, an operation unit configured to move the screw relative to the body portion. The screw is movable in a plurality of directions including a direction along an optical axis of the image pickup apparatus and a direction orthogonal to the optical axis in accordance with an operation of the operation unit by a user.

10 Claims, 11 Drawing Sheets

(56) References Cited

U.S. PATENT DOCUMENTS

2004/0076875 A1* 4/2004 Maggert ............. H01M 2/1055
  429/123
2005/0281554 A1   12/2005 Iwasa

FOREIGN PATENT DOCUMENTS

| | | |
|---|---|---|
| CN | 201302643 Y | 9/2009 |
| CN | 202306095 U | 7/2012 |
| CN | 204155055 U | 2/2015 |
| CN | 209496233 U | 10/2019 |
| EP | 1994-334760 * | 11/1994 |
| EP | 0622663 A1 | 11/1994 |
| JP | 10-221774 A | 8/1998 |
| JP | 2013-064929 A | 4/2013 |

* cited by examiner

ACCESSORY AND CAMERA SYSTEM

BACKGROUND OF THE INVENTION

Field of the Invention

The present invention relates to an accessory attachable to a camera.

Description of the Related Art

Japanese Patent Laid-Open No. 2013-064929 discloses a camera accessory (battery grip) attachable to a camera body in order to provide the same holding performance in portrait mode as that in landscape mode when the user captures an image while holding the camera body in the portrait mode (or vertically).

The battery grip is attached to the camera body via a tripod screw portion and has a connector for power supply to and signal transmissions to and from the camera body. A positional relationship and configuration between the tripod screw portion and the connector often differ according to types of the camera body. It is thus necessary to prepare a battery grip corresponding to each type of camera. As a result, the user needs to purchase a battery grip corresponding to each type of the camera body, and to secure a storage place for it. For the above reasons, a battery grip is required to be generally used for a plurality of types of camera bodies.

SUMMARY OF THE INVENTION

The present invention provides an accessory and camera system, each of which is generally attachable to a plurality of types of camera bodies.

An accessory according to one aspect of the present invention attachable to an image pickup apparatus through an adapter includes a body portion configured to contact the adapter, a screw engageable with a screw hole in the image pickup apparatus through a through-hole formed in the adapter, an operation unit configured to move the screw relative to the body portion. The screw is movable in a plurality of directions including a direction along an optical axis of the image pickup apparatus and a direction orthogonal to the optical axis in accordance with an operation of the operation unit by a user. A camera system including an image pickup apparatus, and the above accessory also constitutes another aspect of the present invention.

An accessory according to another aspect of the present invention attachable between a battery grip and an image pickup apparatus includes a body portion configured to contact the image pickup apparatus, and a first positioning member configured to position relative to the image pickup apparatus. The body portion has a through-hole into which a screw of a battery grip is inserted in order to fix the battery grip to the image pickup apparatus.

Further features of the present invention will become apparent from the following description of exemplary embodiments with reference to the attached drawings.

DESCRIPTION OF THE EMBODIMENTS

Figure 1:
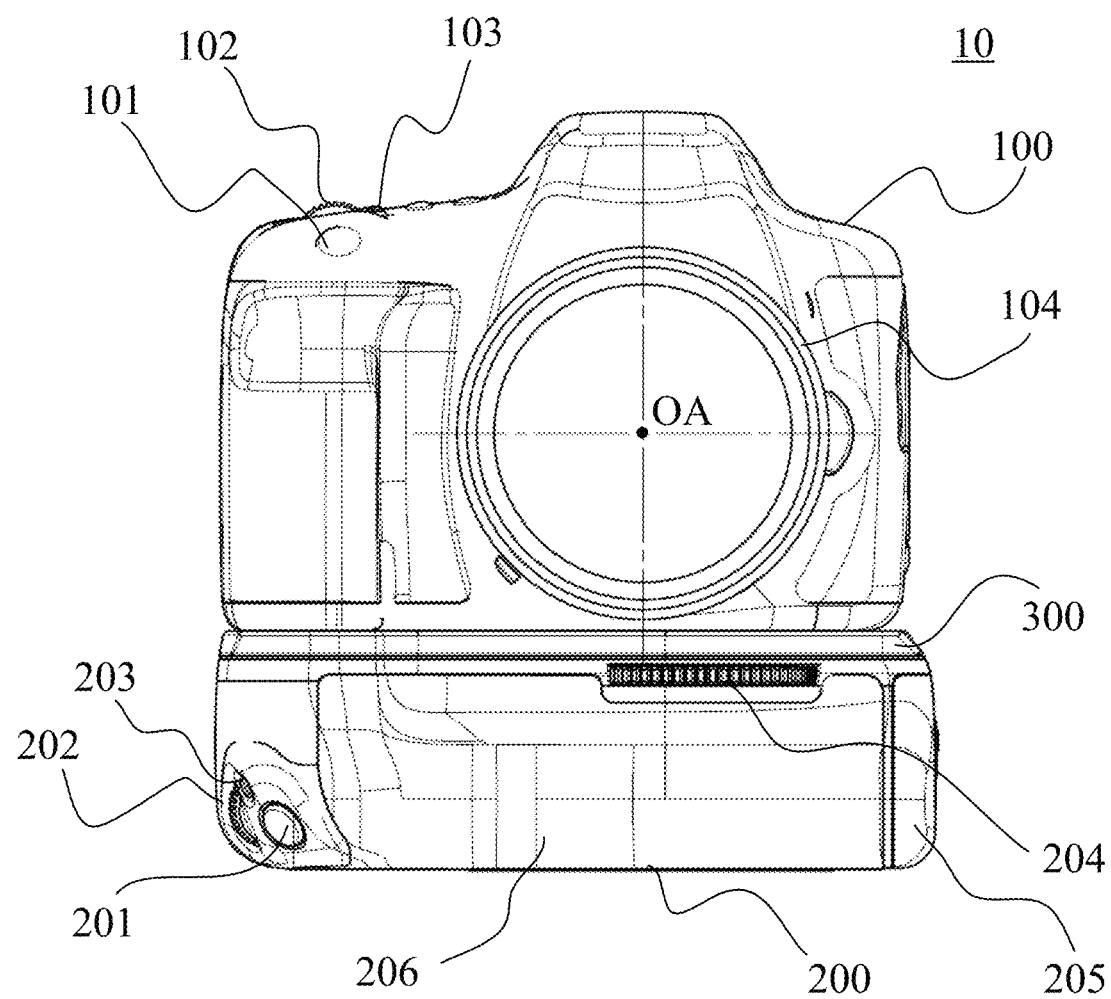
FIG. 1 is a front view of a camera system according to this embodiment of the present invention.

Referring now to the accompanying drawings, a description will be given of embodiments according to the present invention. Corresponding elements in respective figures will be designated by the same reference numerals, and a description thereof will be omitted.

Figures 2A, 2B:
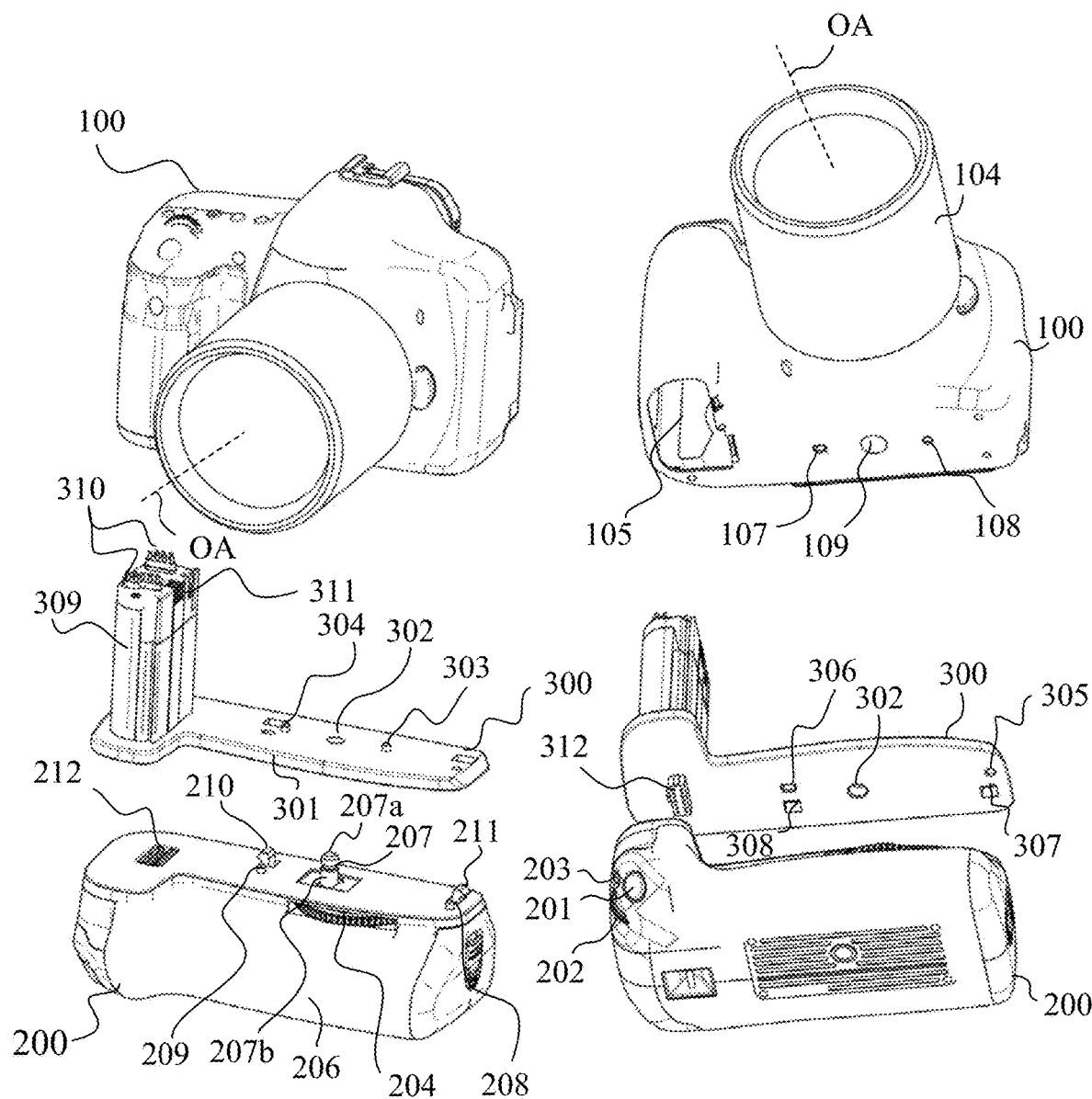
FIGS. 2A and 2B are perspective views of a camera system according to this embodiment.

Referring now to FIGS. 1, 2A, and 2B, a description will be given of a camera system that includes an accessory (battery grip and adapter) according to this embodiment and a camera body (image pickup apparatus) which the accessory is attachable to and detachable from. FIG. 1 is a front view of a camera system 10 according to this embodiment. The camera system 10 includes a camera body (first camera body) 100, a battery grip 200, and an adapter (second adapter) 300. The adapter 300 is provided to connect the battery grip 200 to the camera body 100. FIG. 1 illustrates the battery grip 200 attached to the camera body 100 via the adapter 300. FIGS. 2A and 2B are perspective views of the camera system 10 viewed from different directions, each showing the adapter 300 and the battery grip 200 detached from the camera body 100.

In this embodiment, the camera body 100 is, for example, a digital camera, but may be another camera such as a film-based camera or a video camera. This embodiment describes the battery grip 200 as an example of the accessory (camera accessory), but may use another accessory such as a vertical grip having no power supply function.

A release switch 101, an operation dial 102, and an operation switch 103 are provided above the grip portion of the camera body 100 and provide basic image pickup operations. An image pickup lens (interchangeable lens) 104 is detachably attached to the camera body 100. In this embodiment, the image pickup lens 104 is attachable to and detachable from the camera body 100, but the present invention is not limited to this embodiment. This embodiment is also applicable to an image pickup apparatus in which the image pickup lens 104 and the camera body 100 are integrated with each other.

The battery grip 200 attached to the adapter 300 can be connected to the camera body 100 fixed and electrically connected to the camera body 100 for the basic image pickup operations and power supply. The battery grip 200 includes a release switch 201 used to vertically capture an image, an operation dial 202, and an operation switch 203 (collectively referred to as a second operation unit). The battery grip 200 further includes a grip portion 206. A battery magazine (battery compartment) 205 is loaded in the grip unit 206 for power supply to the camera body 100. The battery grip 200 includes a clamp ring (first operation unit) 204. The battery grip 200 is attachable to and detachable from the camera body 100 by turning the clamp ring 204 and manipulating the screw connection with the tripod screw. The battery grip 200 is applicable to a plurality of types of camera bodies 100 having different positions of the attachment portion and the electric connection portion by attaching different adapters 300 according to the type of the camera body 100.

Referring now to FIGS. 2A and 2B, a description will be given of an outline of a connection structure. The battery grip 200 has a transmission mechanism that rotates a tripod screw 207 by turning the clamp ring 204. The tripod screw 207 is movable in any directions including the optical axis direction of the camera body 100 (along the optical axis OA) and the direction orthogonal to the optical axis OA. Positioning bosses (first positioning members) 208 and 209 provided on the battery grip 200 are engaged with positioning holes (second positioning members) 305 and 306 provided in the base portion (body portion) 301 of the adapter 300 after the battery grip 200 and the adapter 300 are positioned relative to each other. This structure determines the relative position between them. When a cylindrical portion 207b provided at lower part of an external thread portion 207a of the tripod screw 207 is engaged with the positioning hole (through-hole) 302 provided in the base portion 301 of the adapter, the position of the tripod screw 207 is fixed in the radial direction.

Engagement hooks (engagement portions) 210 and 211 provided on the battery grip 200 are engaged with engagement portions 308 and 307 of the adapter 300, respectively. Thereby, the adapter 300 fixes the position of the tripod screw 207 in the thrust direction relative to the battery grip 200. At this time, a connection terminal 312 provided on the bottom surface side of the base portion 301 in the adapter 300 is joined to a connection terminal 212 provided on a top surface side of the battery grip 200. Thereby, the adapter 300 and the battery grip 200 are electrically connected to each other. The adapter 300 is electrically connected from the connection terminal 312 to a signal terminal 310 and a power supply terminal 311 by an unillustrated FPC and a lead wire inside a connection base 309, and provides the electrical connection with the camera body 100.

After the battery grip 200 and the adapter 300 are connected and fixed, the battery grip 200 to which the adapter 300 is attached is fixed to the camera body 100. At this time, positioning bosses (positioning members) 303 and 304 provided on the top surface of the base portion 301 of the adapter 300 are engaged with positioning holes 107 and 108 provided in the bottom surface of the camera body 100, and the adapter 300 and the camera body 100 are positioned with each other. With such a configuration, the tripod screw 207 of the battery grip 200 is positioned relative to the tripod screw hole 109 of the camera body 100 on the adapter 300. Then, the connection base 309 of the adapter 300 is inserted into a battery box portion 105 of the camera body 100, and the signal terminal 310 and the power supply terminal 311 are compressively brought into contact with contacts on a control substrate inside the camera body 100. Thereby, the battery grip 200 is completely electrically connected with the camera body 100 via the adapter 300.

Figure 3A:
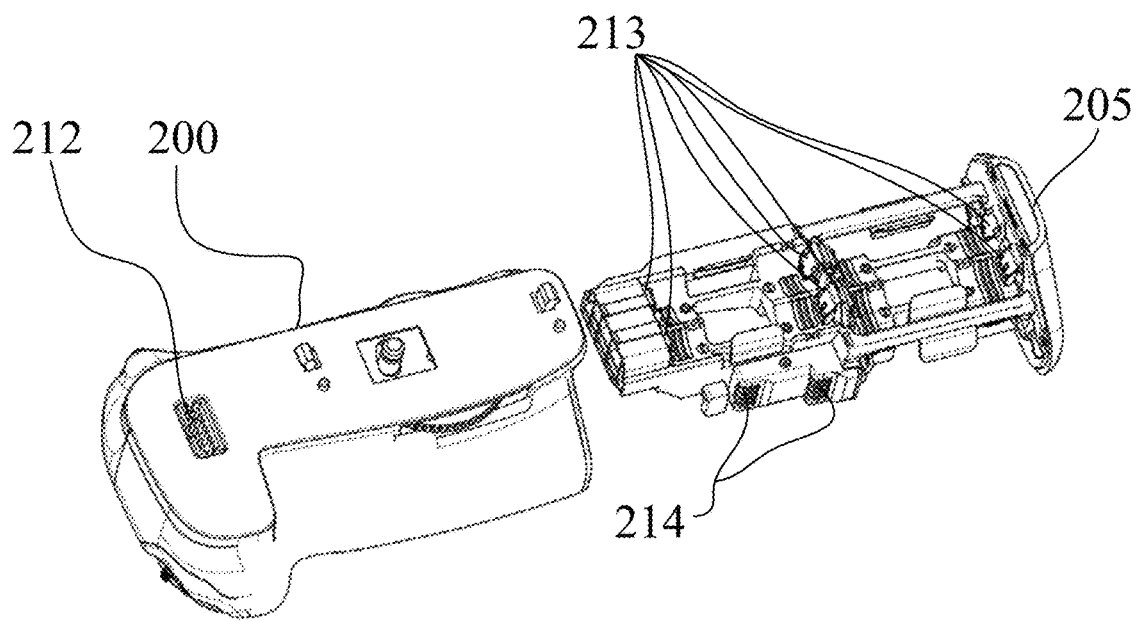
FIGS. 3A and 3B are perspective views of a battery grip according to this embodiment.
Figure 3B:
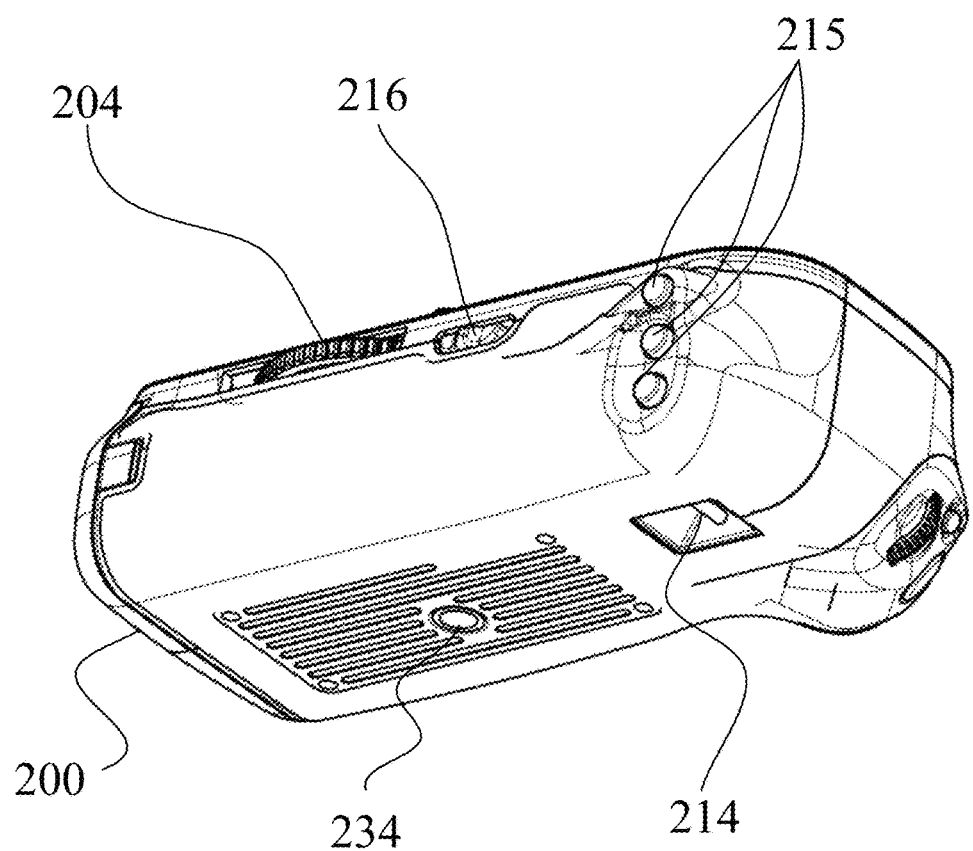

Referring now to FIGS. 3A and 3B, a detailed description will be given of the configuration of the battery grip 200 as a camera attachment (accessory) according to this embodiment. FIGS. 3A and 3B are perspective views of the battery grip 200. FIG. 3A illustrates a state immediately before the battery magazine 205 is loaded into the battery grip 200 viewed from diagonally above, and FIG. 3B illustrates the battery grip 200 viewed from diagonally below (bottom side). This embodiment provides four cell storages capable of storing AA size dry cells and contact portions 213 at both ends of each cell storage in the battery magazine (battery compartment) 205 of the battery grip 200. Each contact is electrically connected to a corresponding magazine connector 214 through an unillustrated FPC. The loaded battery magazine 205 is connected to an unillustrated connector portion in the battery grip 200 and conducted to the connection terminal (connector) 212, and the battery grip 200 is ready to supply the power.

Provided in the bottom side of the battery grip 200 is a tripod screw hole 234 for horizontally fixing onto a tripod or the like the camera body 100 to which the battery grip 200 is connected. In order to attach a strap in the portrait mode, a strap stopper 214 is provided at an upper position on the side surface in the portrait mode. Operation switches (second operation unit) 215 for performing part of the operation of the camera body 100 are provided at the upper part on the eyepiece side when the battery grip 200 is connected to the camera body 100. A lock lever 216 is provided on the backside beside the clamp ring 204, and an unillustrated linkage can switch between a contact and a separation release in order to maintain the engagements of the engagement hooks 210 and 211 with the engaged portions 308 and 307. The lock lever 216 can contact or be separate from a switch provided inside the battery grip 200, and can electrically detect a lock state and the unlock state. This structure allows the battery grip 200 to operate only in the lock state.

Figure 4:
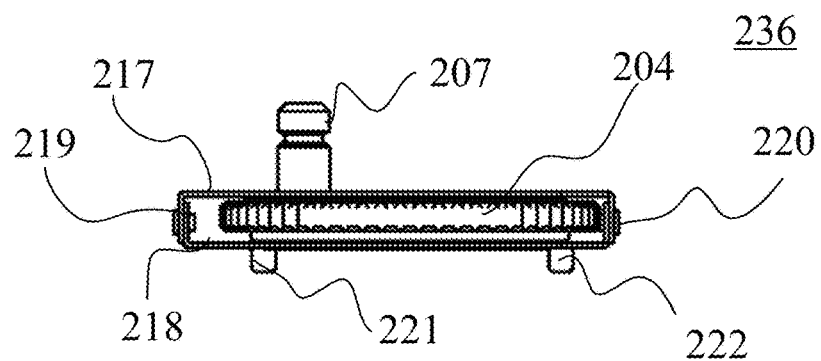
FIG. 4 is a side view of a screw moving unit according to this embodiment.

Referring now to FIGS. 4 to 9, a description will be given of a tripod screw moving unit (moving mechanism) 236 of the tripod screw 207. FIG. 4 is a side view of the tripod screw moving unit 236. In the tripod screw moving unit 236, the clamp ring 204 is rotatably supported by a frame that includes an upper frame 217 and a lower frame 218. The tripod screw 207 has a gear portion (second gear portion) 207c at its lower part, and is rotatable by the transmission from a gear coaxial with and synchronously rotating with the clamp ring 204. The tripod screw 207 is located above the clamp ring 204, rotatable, and movably supported around the rotating center of the clamp ring 204. The details of the moving mechanism of the tripod screw 207 above the clamp ring 204 will be described later with reference to FIGS. 7A, 7B, and 9. Cylindrical projections 221 and 222 are provided at the bottom of the lower frame 218. An upper frame 217 and a lower frame 218 have clamped and fixed their side portions by screws 219 and 220.

Figure 5:
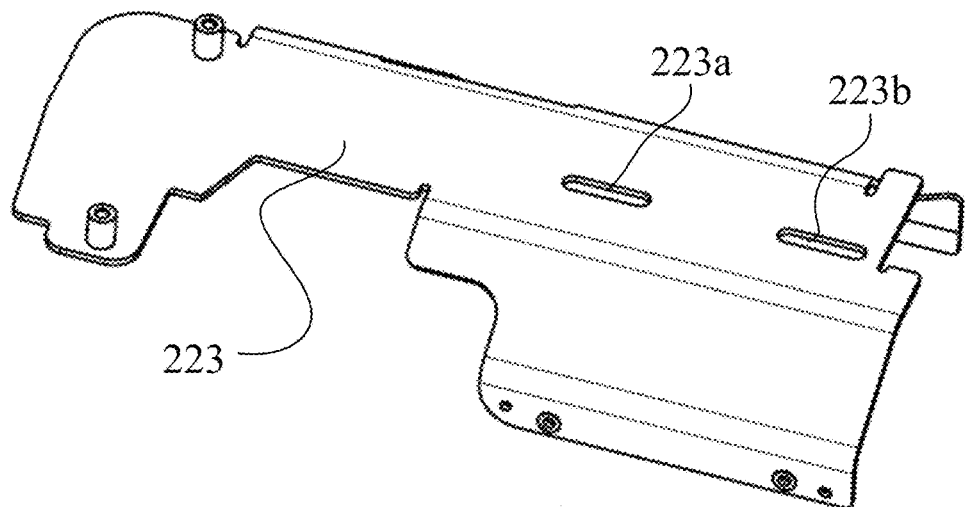
FIG. 5 is a perspective view of a battery grip frame according to this embodiment.

FIG. 5 is a perspective view of the battery grip frame 223 movably mounted with the tripod screw moving unit 236. The battery grip frame 223 is a sheet metal component that constitutes a frame formed to cover the compartment of the battery magazine 205 inside the battery grip 200. A top surface portion of the battery grip frame 223 has elongated holes 223a and 223b, and straight line portions of the elongated holes 223a and 223b are opened in parallel with each other.

Figure 6:
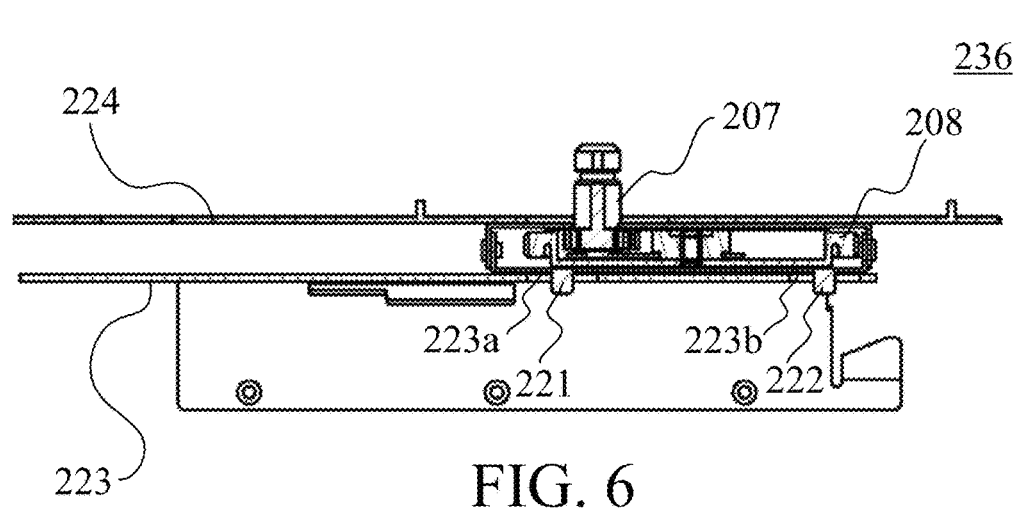
FIG. 6 is a sectional view around the screw moving unit according to this embodiment.

FIG. 6 is a sectional view around the tripod screw moving unit 236 in the battery grip 200. Reference numeral 224 denotes a top plate component (body portion) of the battery grip 200. An upper surface of the tripod screw moving unit 236 is movably restricted relative to the top plate component 224 and the lower surface thereof is movably restricted relative to the battery grip frame 223. The protrusion 221 is engaged with the long hole 223a in the top surface portion of the battery grip frame 223, and the protrusion 222 is engaged with the long hole 223b. Thus, the tripod screw moving unit 236 can be translated along the elongated holes 223a and 223b.

Figures 7A, 7B:
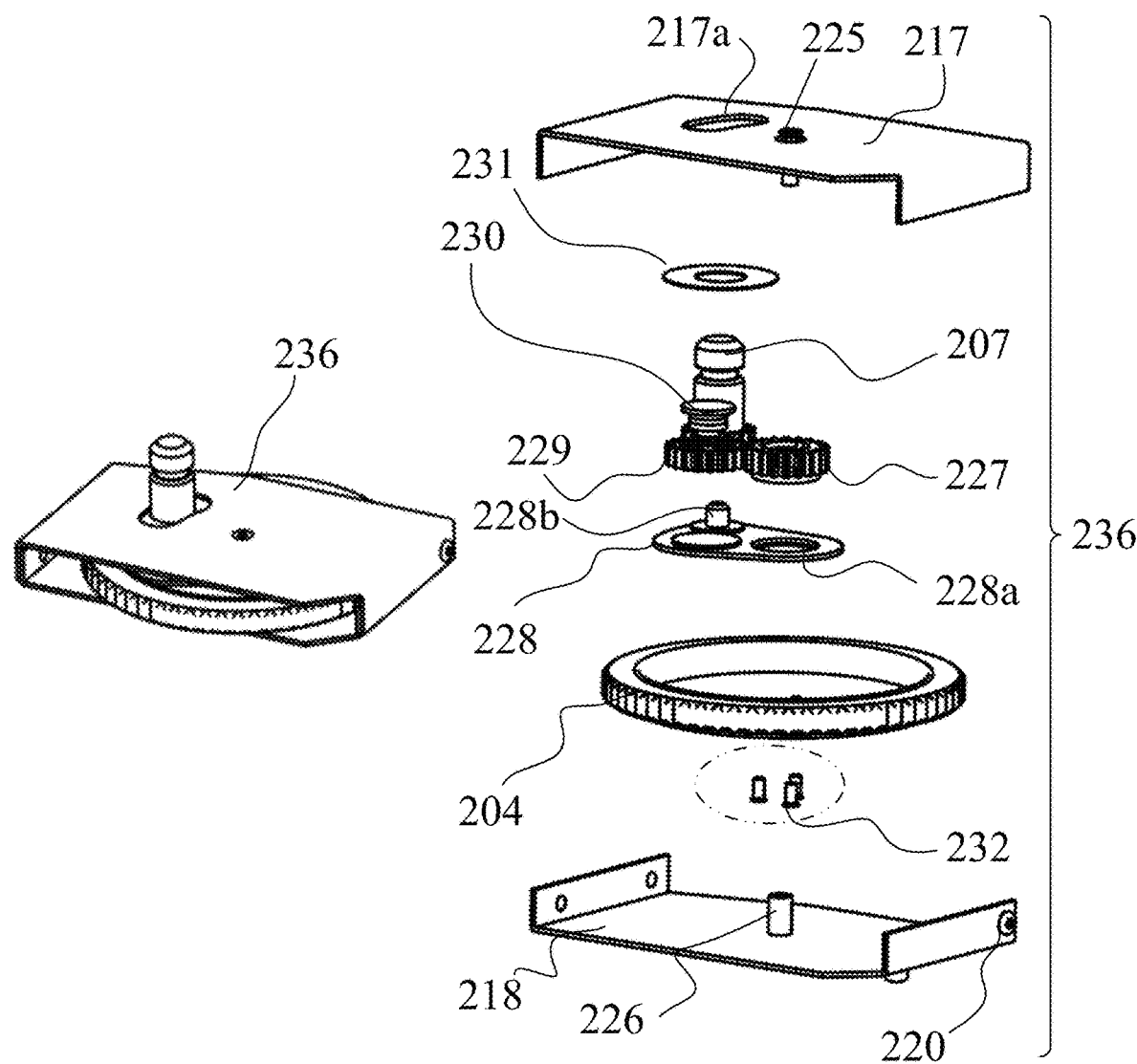
FIGS. 7A and 7B are a perspective view and an exploded perspective view of the screw moving unit according to this embodiment.

FIG. 7A is a perspective view of the tripod screw moving unit 236, and FIG. 7B is an exploded perspective view of the tripod screw moving unit 236. The upper frame 217 has a hole 217a and is configured to restrict the position of the tripod screw 207. A hole is formed at a position corresponding to the rotation center of the clamp ring 204, and a screw 225 passes through the hole and can be tightened. The clamp ring 204 is fixed onto a gear portion 227 by three screws 232 in a state in which a round hole 228a of the rotation base 228 is engaged with the cylindrical portion provided at the lower part of the gear portion (first gear portion) 227. Thus, the clamp ring 204 rotates in synchronization with the gear portion 227. Between the upper frame 217 and the lower frame 218, a rotary shaft 226 is engaged with a rotary shaft hole opened at the center of the gear portion 227, and thereby the clamp ring 204 and the gear portion 227 become rotatable around the rotary shaft 226 as a center. A caulking shaft 230 perforates through a central axis hole in a gear portion 229 above the rotation base 228. Therefore, the gear portion 229 is engaged with the gear portion 227 above the rotation base 228, and rotatably supported at a rotation transmittable position.

Figure 8A:
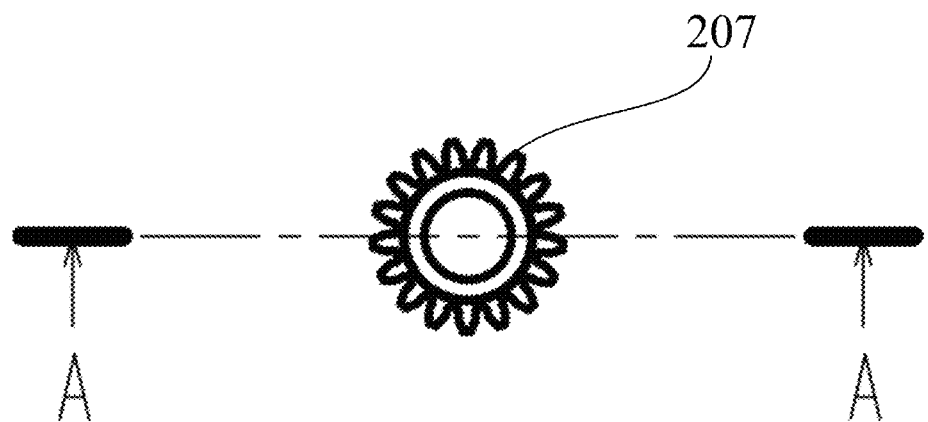
FIGS. 8A and 8B are a plan view and a sectional view of a screw according to this embodiment.
Figure 8B:
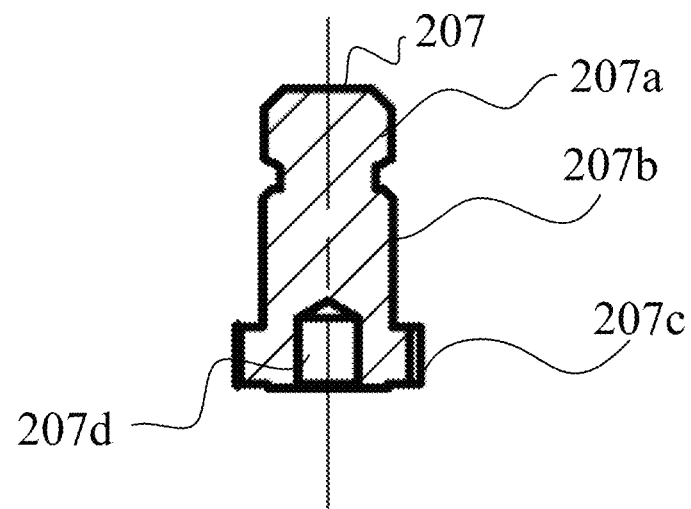

FIG. 8A is a plane view of the tripod screw 207. FIG. 8B is a sectional view taken along a line A-A in FIG. 8A. In the tripod screw 207, the cylindrical portion 207b is provided at the lower part of the external thread portion 207a, and the gear portion 207c is provided at the lowest part. A rotary shaft hole 207d is provided at the central part thereof inside the lower part of the external thread portion 207a. When the rotary shaft hole 207d is engaged with the cylindrical projection 228b on the rotation base 228, the tripod screw 207 can be supported on a rotation transmittable position where the gear portion 207c is engaged with the gear portion 229 above the rotation base 228. A curtain ring 231 covers the back teeth of the gear portion 207c so as to hide the back teeth of the gear portion 207c of the tripod screw 207 from the hole 217a in the upper frame 217.

Figure 9:
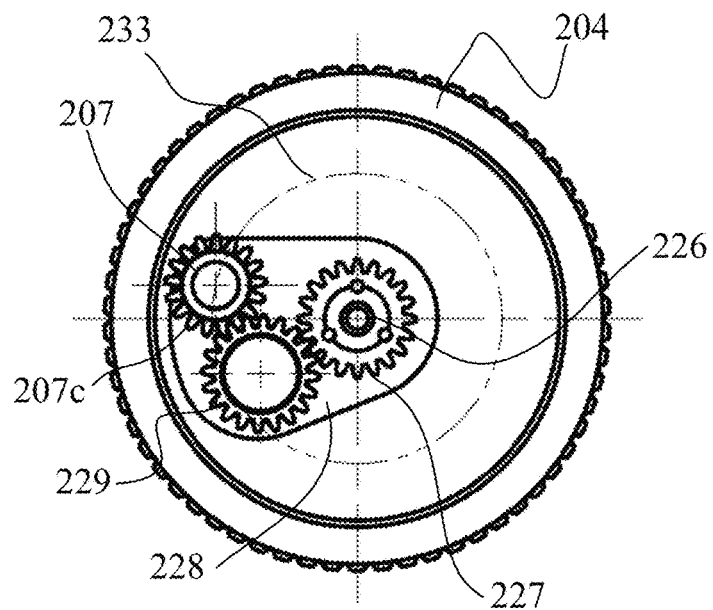
FIG. 9 is a top view showing an engagement (or mating) state of the gear portion on a clamp ring according to this embodiment.

FIG. 9 is a top view showing the engagement (or mating) state among the gear portions 227, 229, and 207c above the clamp ring 204. The gear portion 227 rotates in synchronization with the clamp ring 204. Hence, as the clamp ring 204 rotates, the rotation is transmitted to the gear portions 229 and 207c through the gear portion 227, and the tripod screw 207 rotates. However, the gear portion 229 and the tripod screw 207 are rotatably supported above the rotation base 228. Thus, as the clamp ring 204 rotates in this state, it cannot rotate around the tripod screw 207 because it merely moves with the rotary base 228 around the rotary shaft 226 (along a long and two short dashes line 233). On the other hand, as described above, due to the assembly with the adapter 300, the cylindrical portion 207b of the tripod screw 207 is engaged with the positioning hole 302 provided in the base portion 301 of the adapter 300 and its position is restricted, and the rotation base 228 is restricted from moving. Thereby, the rotation of the clamp ring 204 is transmitted to the gear portions 229 and 207c through the gear portion 227, and the tripod screw 207 can be rotated around its axis.

As described above, the tripod screw 207 of the battery grip 200 attached to the camera body 100 is movable in two directions or in the optical axis direction and the direction orthogonal to the optical axis. By combining the battery grip 200 with the adapter 300, the tripod screw 207 can be positioned according to the camera body 100 and the clamp ring 204 can provide a clamping operation.

Figure 10:
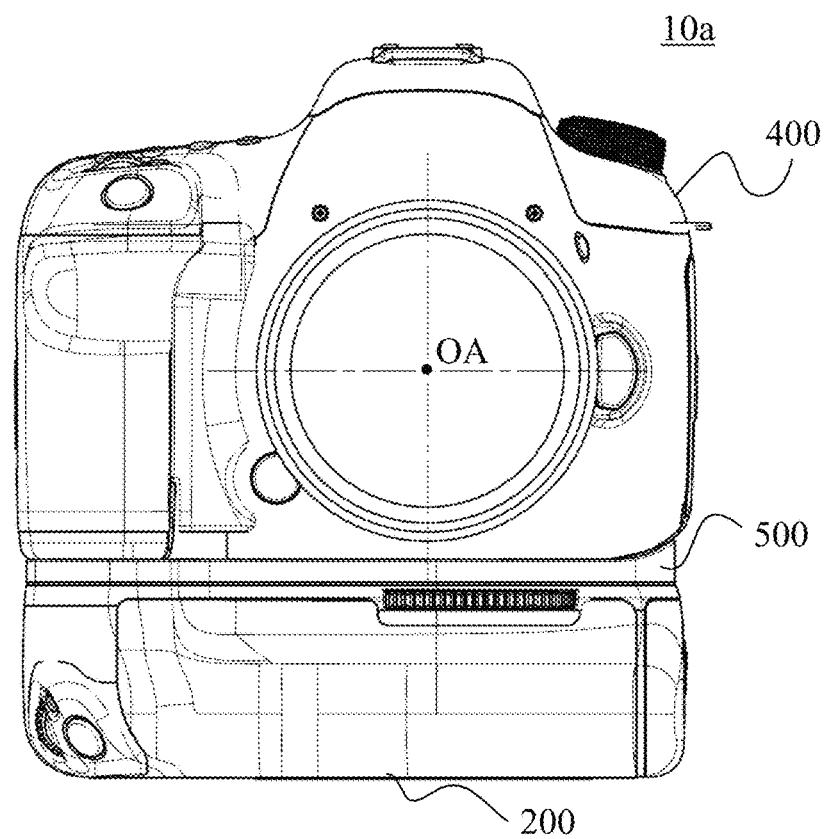
FIG. 10 is a front view of another camera system according to this embodiment.
Figure 11:
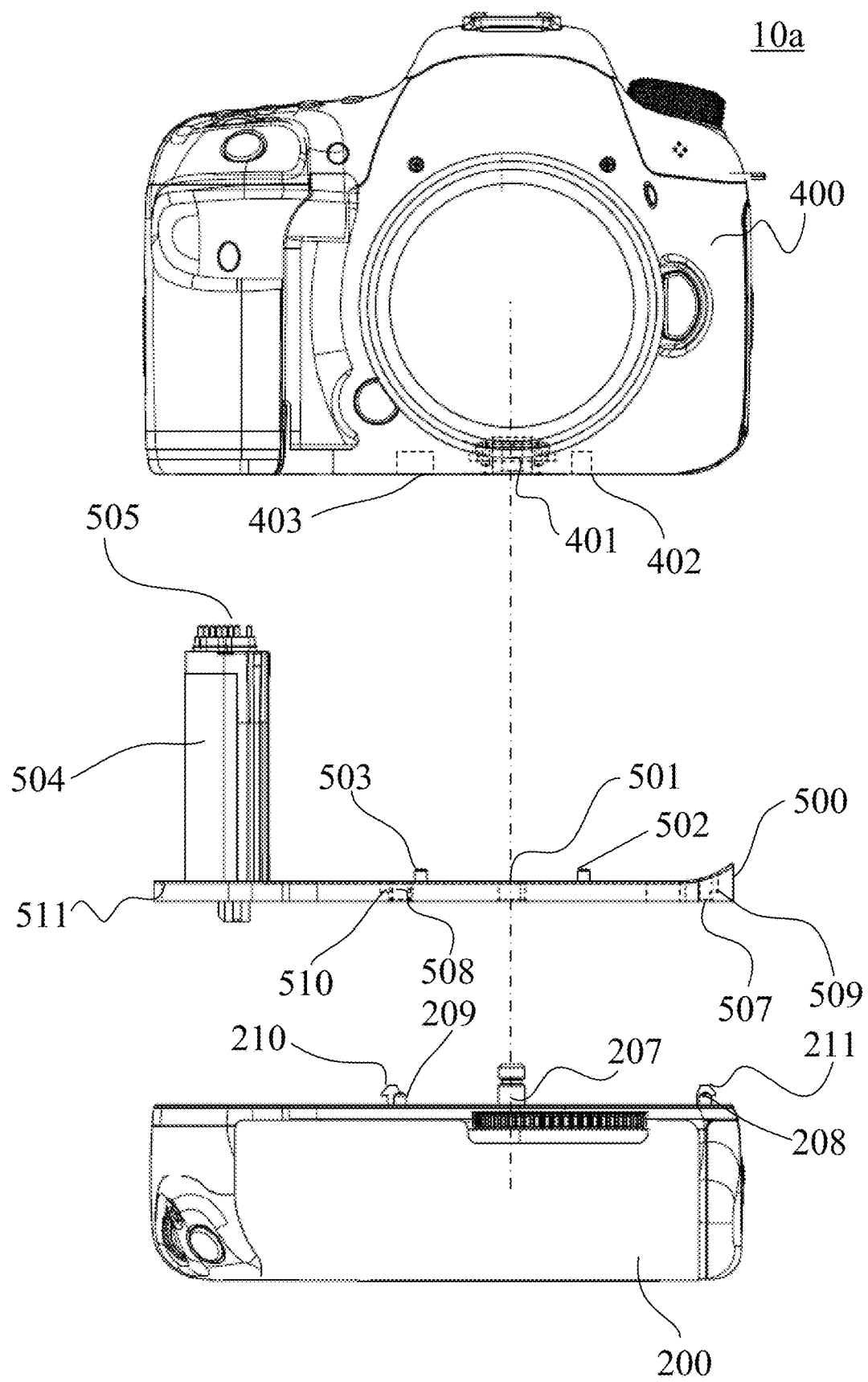
FIG. 11 is an exploded view of the other camera system according to this embodiment.

Referring now to FIGS. 10 to 14, a description will be given of the battery grip 200 applicable to a plurality of types of camera bodies. FIG. 10 is a front view of another camera system 10a. The camera system 10a includes a camera body (second camera body) 400 and an adapter (second adapter) 500 different from the camera body (first camera body) 100 and the adapter (first adapter) 300, and a battery grip 200. FIG. 11 is an exploded view of the camera system 10a (camera body 400, adapter 500, and battery grip 200).

The camera body 400 has an outer shape slightly larger than that of the camera body 100. Thus, positions of positioning bosses 502 and 503 of the adapter 500 are set in a well-balanced manner with the battery grip 200, fixed and shifted to the right direction in FIG. 11 relative to the positional relationship between the camera body 100 and the battery grip 200. The position of a positioning hole 501 is set so as to be engaged with the tripod screw hole 401 accordingly. At this time, positions of a connection base 504 and a connection terminal 505 are set so as to provide the electrical connection to the camera body 400. An outer shape of an adapter base portion 511 differs from that of the adapter 300 so as to correspond to the camera body 400. However, the positioning mechanism, the engagement portion, the electrical connection terminal, and the like with the battery grip 200 are similar to those of the adapter 300.

As illustrated in FIG. 11, the camera body 400 has positioning holes 403 similar to the positioning holes 107 and 108 in the camera body 100. Similar to the positioning holes 305 and 306 of the adapter 300, the adapter 500 has positioning holes 507 and 508. The adapter 500 has engaged portions 509 and 510 similar to the engaged portions 307 and 308 of the adapter 300.

Figure 12:
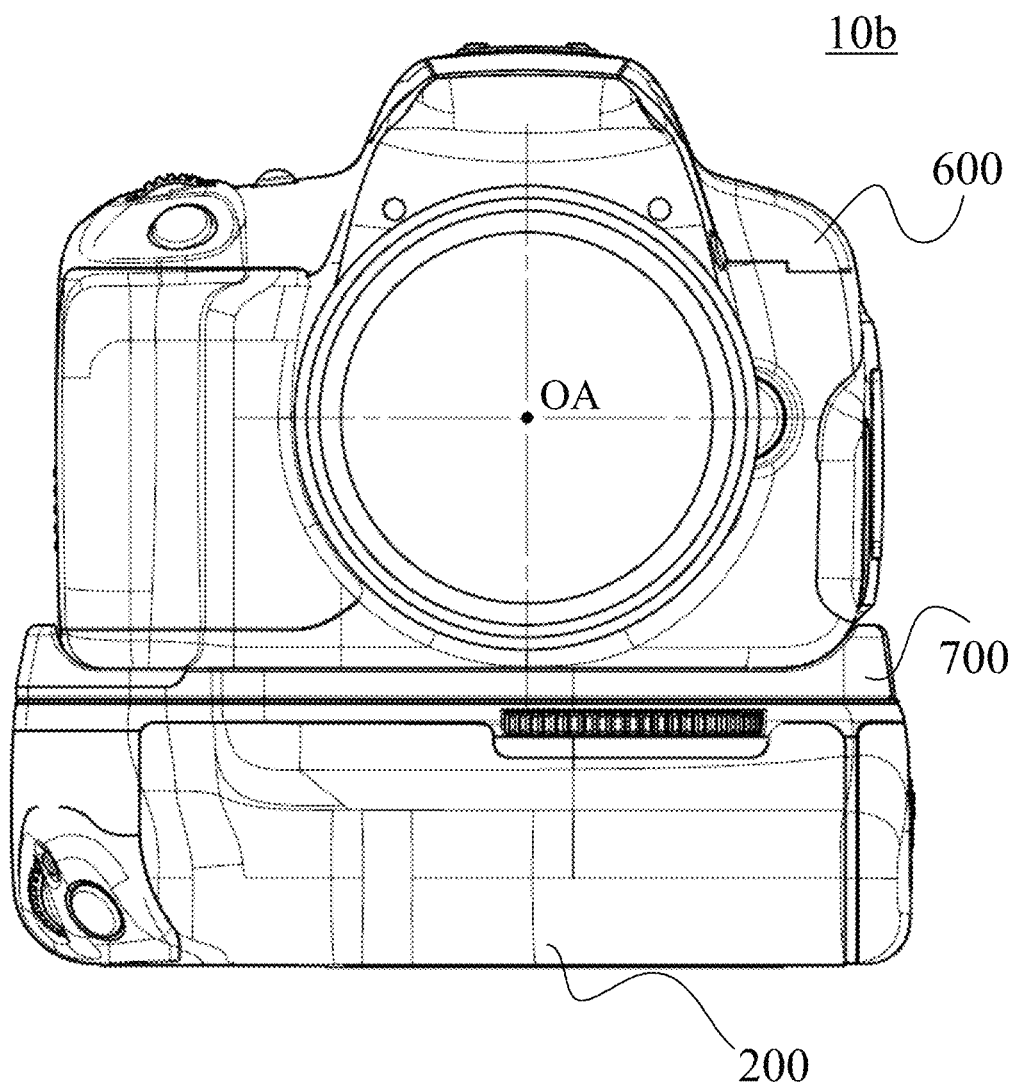
FIG. 12 is a front view of still another camera system according to this embodiment.
Figure 13:
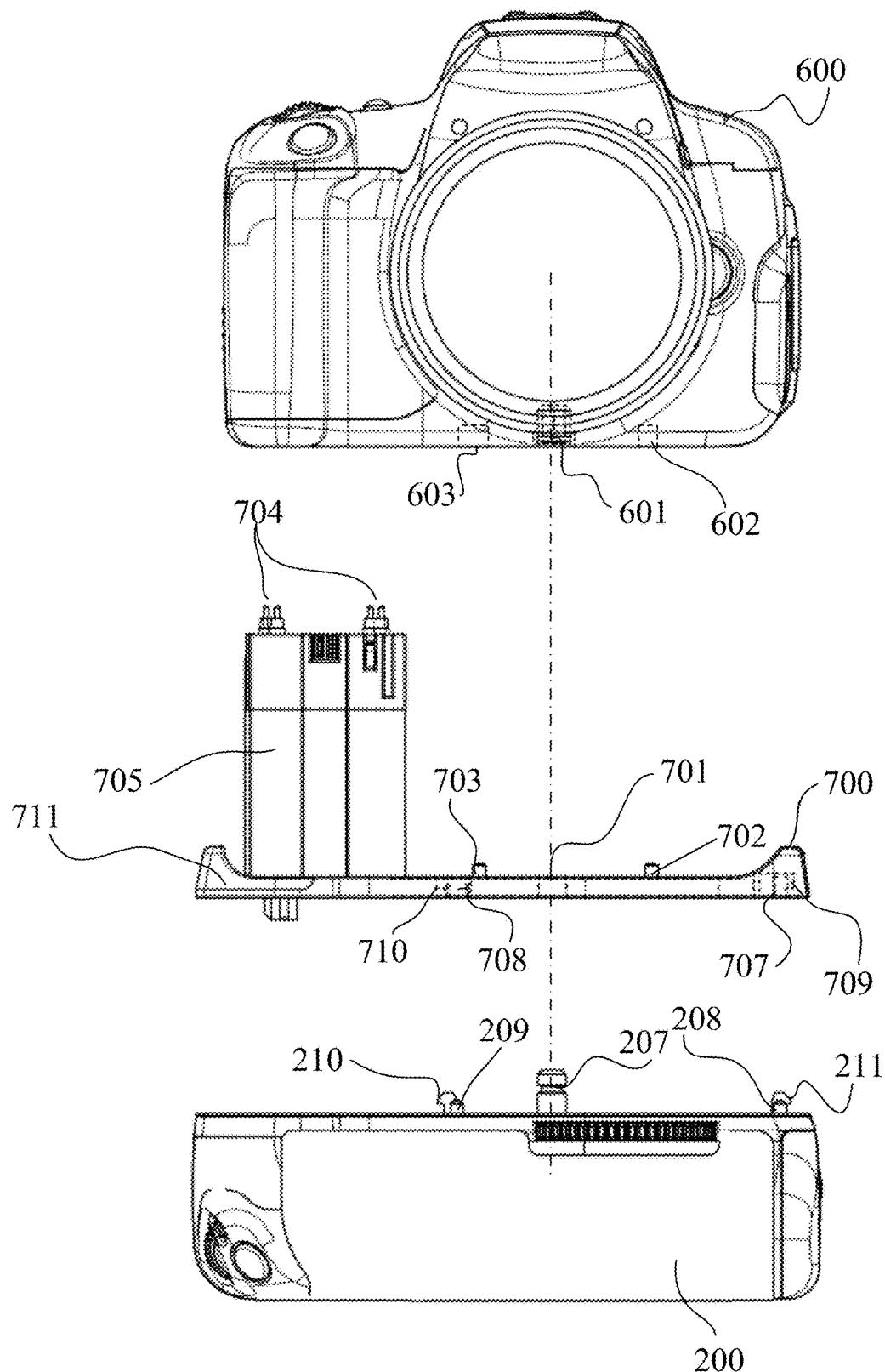
FIG. 13 is an exploded view of the still other camera system according to this embodiment.

FIG. 12 is a front view of still another camera system 10b. The camera system 10b includes a camera body (third camera body) 600 and an adapter (third adapter) 700 different from the camera body (second camera body) 400 and the adapter (second adapter) 500, and a battery grip 200. FIG. 13 is an exploded view of the camera system 10b (camera body 600, adapter 700, and battery grip 200).

The camera body 600 has an outer shape slightly smaller than that of the camera body 100. Thus, positions of positioning bosses 702 and 703 of the adapter 700 are set in a well-balanced manner with the battery grip 200, fixed and shifted to the center in the left direction in FIG. 13 relative to the positional relationship between the camera body 100 and the battery grip 200. The camera body 600 is positioned in the optical axis direction so as to be located slightly forward in comparison with positional relationship between the camera body 100 and the battery grip 200. The position of the positioning hole 701 is set so as to be engaged with the tripod screw hole 601 accordingly. At this time, positions of a connection terminal 704 and a connection base 705 are set so as to provide the electrical connection with the camera body 600.

The camera body 600 has a specification such that an attached orientation of a dedicated battery differs by 90° from that in the camera body 100, and thus the positions of the connection terminal 704 and the connection base 705 of the adapter 700 are significantly different from those of the adapters 300 and 500. An outer shape of an adapter base portion 711 is different from that of each of the adapters 300 and 500 so as to correspond to the outer shape of the camera body 600. However, the positioning mechanism, the engagement portion, the electrical connection terminal and the like with the battery grip 200 are similar to those of the adapters 300 and 500.

As illustrated in FIG. 13, the camera body 600 has positioning holes 603 and 602 similar to the positioning holes 107 and 108 in the camera body 100. Similar to the positioning holes 305 and 306 of the adapter 300, the adapter 700 has positioning holes 707 and 708. The adapter 700 has engaged portions 709 and 710 similar to the engaged portions 307 and 308 of the adapter 300.

Figure 14:
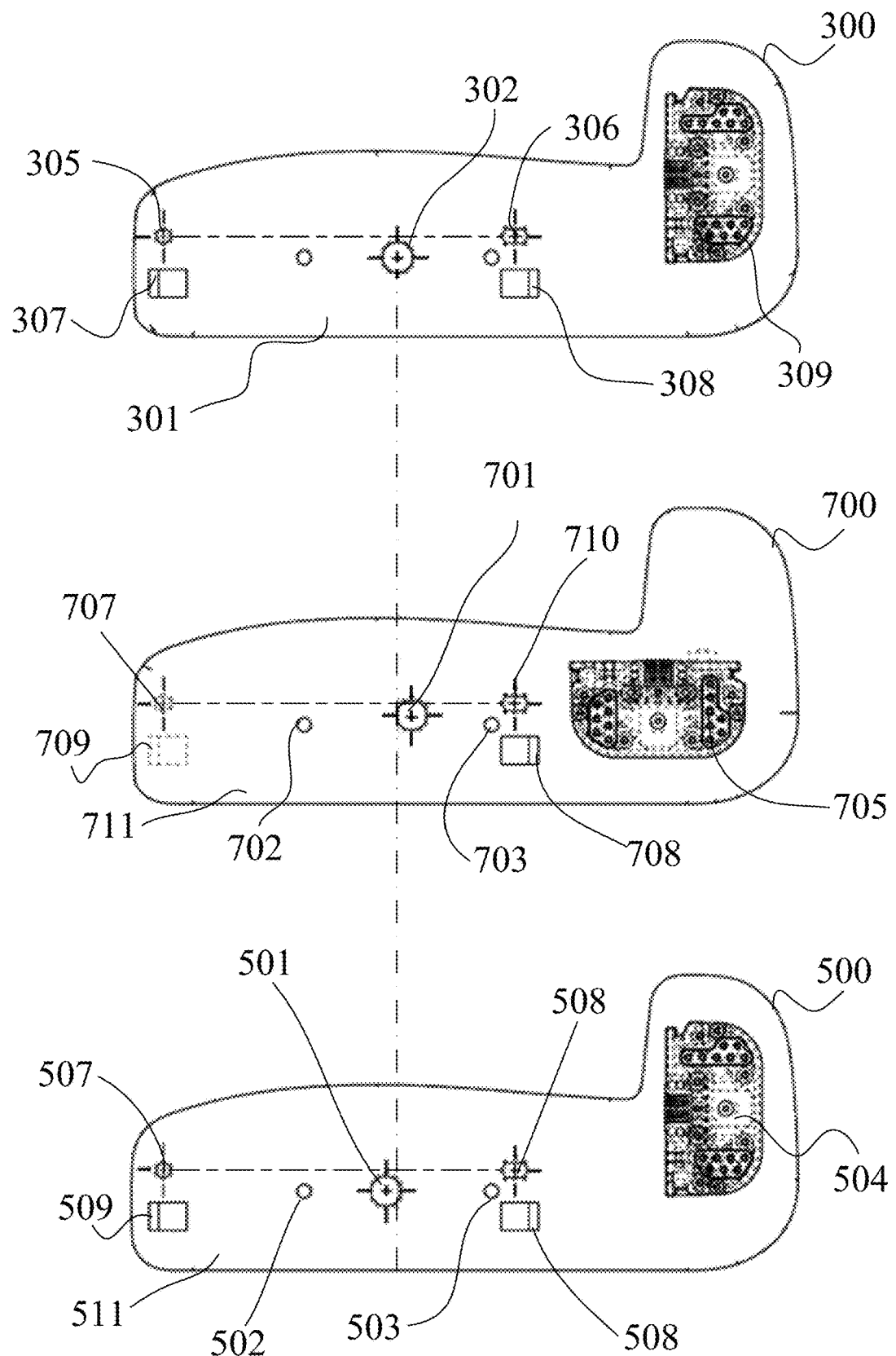
FIG. 14 is a top view of a first adapter, a second adapter, and a third adapter according to this embodiment.

FIG. 14 is a top view of the adapters 200, 500, and 700. As illustrated in FIG. 14, in accordance with the camera body 100, 400, and 600 to be used, the configuration, such as the positions of the connector and the tripod screw hole, and the positioning mechanism with the camera body, is changed in the adapter. Thereby, the battery grip 200 can correspond to a plurality of types of camera bodies. In the battery grip 200, by make movable the tripod screw according to the adapter, the attachment structure of the adapter to the camera body is eliminated and the structure can be made simpler with only the positioning function and the electrical connection function. This structure can reduce the adapter cost in comparison with the adapter that needs to be changed for each camera body. The battery grip 200 can be generally used for a plurality of types of camera bodies only by making movable the tripod screw portion and by providing only a simple connection mechanism to the adapter.

Thus, the accessory according to this embodiment is an accessory (battery grip 200) attachable to the camera body 100 (400, 600) through an adapter 300 (500, 700). The accessory includes a body portion (top plate component 224), a screw (tripod screw 207), and a first operation unit (clamp ring 204). The body portion contacts the adapter. The screw is engageable with a screw hole (tripod screw hole 109) in the camera body through a through-hole (positioning hole 302, 501, or 701) formed in the adapter. The first operation unit moves the screw relative to the body portion. The screw is movable in a plurality of directions including a direction along an optical axis of a camera body and a direction orthogonal to the optical axis in accordance with an operation of the first operation unit by a user.

The screw may have the external thread portion 207a engageable with the tripod screw hole, and the cylindrical portion 207b engaged with the through-hole in the adapter. A position of the cylindrical portion may be restricted by an engagement between the cylindrical portion and the through-hole. The accessory may have a positioning member (positioning boss 208 or 209) for positioning relative to the adapter, and engaging portions (engagement hook 210 or 211) fixed onto the adapter. The accessory may have a grip portion 206 to be held by the user. The grip may be held by the user when the camera body is vertically held.

The accessory may have a second operation unit (release switch 201, operation dial 202, operation switch 203, or operation switch 215) operated by the user to operate the camera body. The accessory may have a battery compartment (battery magazine 205) for storing a battery. The operation unit may have a first gear portion (gear portion 227), and the screw has a second gear portion (gear portion 207c) to which the rotation of the first gear is transmitted.

An accessory of this embodiment is an accessory (adapter 300, 500, or 700) attachable between a battery grip and a camera body, and includes a body portion (base portion 301) and a positioning member (positioning boss 303 or 304). The body portion contacts the camera body. The positioning member performs positioning relative to the camera body. The body portion has a through-hole (positioning hole 302, 501, or 701) into which a screw of the battery grip is inserted in order to fix the battery grip to the camera body.

A central axis of the through-hole may coincide with a central axis of the screw hole (tripod screw hole 109) of the camera body after positioning by the positioning member relative to the camera body. A diameter of the through-hole may be larger than a diameter of the screw of the battery grip. The accessory may have a second positioning member (positioning hole 305 or 306) for positioning relative to the battery grip, and engaged portions 307 and 308 used to fix the battery grip. The accessory may have a contact portion (signal terminal 310 or connection terminal 312) configured to electrically connect the camera body and the battery grip to each other.

This embodiment makes movable and operable the fixing member (tripod screw portion) of the attachment (battery grip) of the camera body, and uses a simple connecting mechanism with the adapter. This structure can achieve an attachment to a plurality of types of camera bodies only by changing the adapter. As a result, it is possible to reduce the development cost, the manufacturing cost, and other costs when multiple types of camera bodies are used. Hence, this embodiment can provide an accessory and a camera system that can be generally attached to a plurality of types of camera bodies with a simple and inexpensive configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, this embodiment provides a simple engagement mechanism between the battery grip as an attachment (accessory) of the camera body and the adapter, but the attachment to the camera body is available even without an engagement mechanism for fixing the accessory and the adapter. This embodiment describes the versatility to a plurality of types of camera bodies using the same dedicated battery, but is applicable to a product type compatible with a battery having a different shape by accordingly changing the shape and specification of the adapter.

This application claims the benefit of Japanese Patent Application No. 2018-165023, filed on Sep. 4, 2018, which is hereby incorporated by reference herein in its entirety.

What is claimed is:

1. An adapter attachable between a grip and a camera body, the adapter comprising:
an adapter body portion which contacts the camera body, a through-hole being formed in the adapter body portion; and
a first positioning member for positioning relative to the camera body,
wherein the grip includes:
a grip body portion which contacts the adapter;
a second positioning member for positioning relative to the adapter;
a screw engageable with a screw hole in the camera body through the through-hole;
an operation unit configured to move the screw relative to the grip body portion, wherein the screw is movable in a plurality of directions including a direction along an optical axis of the camera body and a direction orthogonal to the optical axis in accordance with an operation of the operation unit by a user, and wherein the through-hole into which the screw of the grip is inserted to fix the grip and the camera body, has a diameter larger than a diameter of the screw.

2. The adapter according to claim 1, further comprising:
a first contact portion configured to electrically connect the camera body and the adapter; and
a second contact portion configured to electrically connect the adapter and the grip,
wherein the grip is a battery grip having a battery compartment configured to store a battery, and
wherein information on a signal and information on a power which are generated in the battery grip are transmitted to the camera body through the first and second contact portions.

3. The adapter according to claim 1, wherein the screw is engageable with the screw hole such that a central axis of the through-hole coincides with a central axis of the screw hole of the camera body in accordance with the operation of the operation unit by the user after positioning by the first and second positioning members relative to the camera body.

4. A grip attachable to a camera body through an adapter, wherein the adapter includes:
an adapter body portion which contacts the camera body, a through-hole being formed in the adapter body portion; and
a first positioning member for positioning relative to the camera body,
the grip comprising:
a grip body portion which contacts the adapter;
a second positioning member for positioning relative to the adapter;
a screw engageable with a screw hole in the camera body through the through-hole;
an operation unit configured to move the screw relative to the grip body portion,
wherein the screw is movable in a plurality of directions including a direction along an optical axis of the camera body and a direction orthogonal to the optical axis in accordance with an operation of the operation unit by a user, and
wherein the through-hole into which the screw of the grip is inserted to fix the grip and the camera body, has a diameter larger than a diameter of the screw.

5. A camera body to which a grip is attachable through an adapter,
wherein the adapter includes:
an adapter body portion which contacts the camera body, a through-hole being formed in the adapter body portion; and
a first positioning member for positioning relative to the camera body,
wherein the grip includes:
a grip body portion which contacts the adapter;
a second positioning member for positioning relative to the adapter;
a screw engageable with a screw hole in the camera body through the through-hole;
an operation unit configured to move the screw relative to the grip body portion,
wherein the screw is movable in a plurality of directions including a direction along an optical axis of the camera body and a direction orthogonal to the optical axis in accordance with an operation of the operation unit by a user, and
wherein the through-hole into which the screw of the grip is inserted to fix the grip and the camera body, has a diameter larger than a diameter of the screw.

6. An adapter attachable between an accessory and an optical apparatus, the adapter comprising:
an adapter body portion which contacts the optical apparatus, a through-hole being formed in the adapter body portion; and
a first positioning member for positioning relative to the optical apparatus,
wherein the accessory includes:
an accessory body portion which contacts the adapter;
a second positioning member for positioning relative to the adapter;
a screw engageable with a screw hole in the optical apparatus through the through-hole; and
an operation unit configured to move the screw relative to the accessory body portion,
wherein the screw is movable in a plurality of directions including a direction along an optical axis of the optical apparatus and a direction orthogonal to the optical axis in accordance with an operation of the operation unit by a user, and
wherein the through-hole into which the screw of the accessory is inserted to fix the accessory and the optical apparatus, has a diameter larger than a diameter of the screw.

7. The adapter according to claim 6, further comprising:
a first contact portion configured to electrically connect the optical apparatus and the adapter; and
a second contact portion configured to electrically connect the adapter and the accessory,
wherein the accessory is a battery grip having a battery compartment configured to store a battery, and
wherein information on a signal and information on a power which are generated in the battery grip are transmitted to the optical apparatus through the first and second contact portions.

8. The adapter according to claim 6, wherein the screw is engageable with the screw hole such that a central axis of the through-hole coincides with a central axis of the screw hole of the optical apparatus in accordance with the operation of the operation unit by the user after positioning by the first and second positioning members relative to the optical apparatus.

9. An accessory attachable to an optical apparatus through an adapter,
wherein the adapter includes:
an adapter body portion which contacts the optical apparatus, a through-hole being formed in the adapter body portion; and
a first positioning member for positioning relative to the optical apparatus, the accessory comprising:
an accessory body portion which contacts the adapter;
a second positioning member for positioning relative to the adapter;
a screw engageable with a screw hole in the optical apparatus through the through-hole;
an operation unit configured to move the screw relative to the accessory body portion,
wherein the screw is movable in a plurality of directions including a direction along an optical axis of the optical apparatus and a direction orthogonal to the optical axis in accordance with an operation of the operation unit by a user, and wherein the through-hole into which the screw of the accessory is inserted to fix the accessory and the optical apparatus, has a diameter larger than a diameter of the screw.

10. An optical apparatus to which an accessory is attachable through an adapter, wherein the adapter includes:
- an adapter body portion which contacts the optical apparatus, a through-hole being formed in the adapter body portion; and
- a first positioning member for positioning relative to the optical apparatus, wherein the accessory includes:
- an accessory body portion which contacts the adapter;
- a second positioning member for positioning relative to the adapter;
- a screw engageable with a screw hole in the optical apparatus through the through-hole;
- an operation unit configured to move the screw relative to the accessory body portion, wherein the screw is movable in a plurality of directions including a direction along an optical axis of the optical apparatus and a direction orthogonal to the optical axis in accordance with an operation of the operation unit by a user, and wherein the through-hole into which the screw of the accessory is inserted to fix the accessory and the optical apparatus, has a diameter larger than a diameter of the screw.

\* \* \* \* \*